United States Patent Office 3,040,883
Patented June 26, 1962

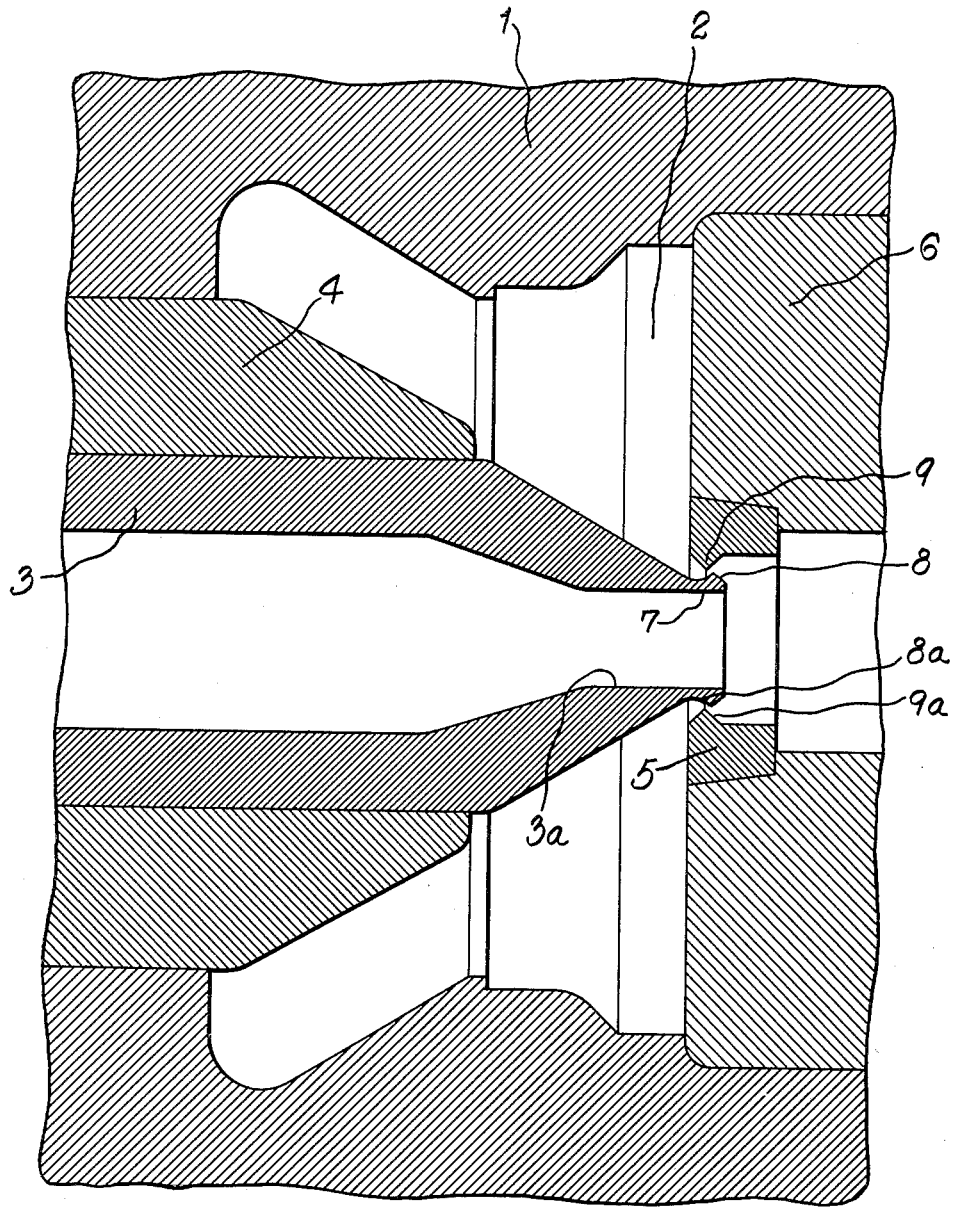

3,040,883
PRESS FOR EXTRUDING TUBING AND THE LIKE WHILE AVOIDING CONTRACTIONS
Engelbert Friesenhagen, Porz (Rhine), Germany, assignor to Felten & Guilleaume Carlswerk A.G., Koln-Mulheim, Germany, a corporation of Germany
Filed May 29, 1959, Ser. No. 816,859
1 Claim. (Cl. 207—4)

This invention relates to extrusion presses of the type used for extruding tubing, and the like, by intermittent application of pressure to the extrusion material in the pressing chamber. More particularly, the invention relates to an improved extrusion press of this type which avoids the contraction rings usually formed in the extruded tubing due to interruptions of the extruding pressure.

Extrusion presses of the type described, as commonly made, comprise a head having a pressing chamber into which the metal or other material to be extruded is charged under pressure, a die forming an opening leading from the chamber, and a fixed mandrel extending centrally through the chamber and having its tip located in the die opening to form therewith an annular extrusion passage. The metal or other material to be extruded is charged into the pressing chamber by means of a piston operating in a feed cylinder which opens into the pressing chamber, so that the feeding stroke of the piston presses the material around the mandrel in the pressing chamber and out through the annular extrusion passage in the die. In cases where the extruded material is to serve as a sheathing for electric cable, the mandrel is provided with a passage leading into the die and through which the cable core is advanced during the working stroke of the feed piston, so that the material is extruded as a tubular sheath directly around the cable core.

In the operation of such extrusion presses, the extruding pressure is interrupted from time to time, as when the feed piston is retracted incident to introducing into the feed cylinder a new charge of material to be extruded; and each interruption normally results in a contraction of the wall thickness of that part of the tubing which happens to be located in the annular extrusion passage in the die when the interruption occurs. These contractions, sometimes referred to as "bamboo rings," extend around the circumference of the tubing and are very objectionable in that they represent weak spots which may collapse or break open upon bending of the tubing. They are caused by the fact that the mandrel and die are pressed apart upon application of the extruding pressure but spring back toward each other when the pressure is released or interrupted. The "bamboo rings" are particularly apparent and objectionable in the case of tubing extruded from aluminum, as for cable sheathing, because aluminum must be extruded at high pressure.

Various attempts have been made to overcome the above noted problem: For example, in order to counteract formation of "bamboo rings" upon interruptions of the pressing operation, it has been proposed to effect some readjustment of the mandrel, as by means of a reversible driving mechanism for moving the mandrel in one direction or the other, depending on the pressure condition prevailing in the pressing chamber of the press head. It has also been attempted to subject the mandrel or the mandrel holder to an initial tension by pressing them together axially, as by means of a pressure nut, so that the mandrel and the mandrel holder cannot be displaced axially to any appreciable degree by the extrusion pressure. Additionally, it has been proposed to avoid displacement of the mandrel under the extrusion pressure by subjecting it to a hydro-static counter-pressure which is equivalent to the extrusion pressure. In the case of extrusion presses of the double block type in which two feed pistons operate alternately to charge the pressing chamber with the material to be extruded, it has been attempted to avoid "bamboo rings" by eliminating loss of compression of the material filling the pressing chamber, so as to obtain a continuous extrusion without interruption of the extrusion pressure. However, none of these expedients, in so far as I am aware, have produced satisfactory results.

It has also been proposed recently to reduce the danger of breaking of the extruded cable sheath or tubing by designing the pressing tools (the die and the mandrel) in such a way that the "bamboo rings" will assume the shape of an ellipse; but this expedient also leaves much to be desired.

The principal object of the present invention is to provide an extrusion press of the type described in which the formation of "bamboo rings" on the extruded tubing is avoided in a simple manner, thus enabling production of perfect tubes, or the like, in unlimited lengths, regardless of the feeding capacity of the press.

According to the invention, the tendency for the mandrel and die to be displaced relative to each other, in response to application and interruption of the extruding pressure, is used to advantage in that a reduction of the extrusion pressure, as by interruption of the pressing operation, immediately causes the annular extrusion passage to become enlarged rather than constricted.

In an extrusion press made according to the invention, the die member has an annular internal surface partly defining the annular extrusion passage around the mandrel member, this annular surface extending at an angle to the direction in which the mandrel member is urged by the extrusion pressure in the pressing chamber of the head. The mandrel member has an annular external surface opposing this angled surface of the die member and positioned to constrict the annular extrusion passage upon relative movement of the die and mandrel members under the extrusion pressure in the pressing chamber. Means are provided for mounting one of the die and mandrel members for movements in opposite directions in response to application and interruption, respectively, of the extruding pressure. Thus, upon application of the extruding pressure, the movable member is urged in a direction to bring the angled, opposed annular surfaces of the die and mandrel members closer together, thereby constricting the annular extrusion passage. On the other hand, interruption of the extrusion pressure causes the movable member to spring back in the opposite direction and enlarge the annular extrusion passage between the angled, opposed annular surfaces.

Either the die or the mandrel is mounted for limited movements back and forth in response to the application and interruption of the extrusion pressure, or both of these members may be so mounted. In the presently preferred construction, the angled, annular internal surface of the die member is flared to define an enlargement of the die opening in the direction of extrusion therethrough, the opposing annular surface of the mandrel member being flared so that it is generally parallel to the flared surface of the die member and being spaced from this die surface in the direction of extrusion through the die opening.

For a better understanding of the invention, reference may be had to the accompanying drawing, in which the single illustration is a longitudinal sectional view of part of an extrusion press embodying a preferred form of the invention.

Referring to the drawing, the reference numeral 1 designates the head of an extrusion press having a pressing chamber 2. A mandrel 3 is mounted in the head by means of a mandrel holder 4. From the holder 4, the mandrel tapers to a tip 7 located in the opening of a die 5. The latter is mounted in the press head 1 by means of a die holder 6.

It will be understood that the metal or other material to be extruded is charged into the pressing chamber 2 under pressure in the usual manner, as by means of the aforementioned piston operating in a feed cylinder (not shown) which opens into the chamber 2. Under the pressure exerted by the feed piston, the material is forced around the tapered part of mandrel 3 and pressed out of chamber 2 through the annular extrusion passage between the die 5 and the mandrel tip 7. Thus, the extruded material emerging from the die 5 is in the form of a tube. In the illustrated form of the invention, the mandrel 3 is provided with a central passage 3a through which a cable core (not shown) is advanced to the die 5 as the pressing operation proceeds. In this way, the material pressed from chamber 2 is extruded as a cable sheath directly around the cable core emerging from the mandrel passage 3a.

The illustrated form of the press as described above is of well-known construction. In the operation of such a press, the extrusion pressure on the material in chamber 2 acts to urge the mandrel 3 to the left and the die 5 to the right, as viewed in the drawing, as will be readily understood.

In accordance with the invention, the mandrel tip 7 has an external annular bead or enlargement 8 extending around its periphery within the die 5. The latter has an internal bead or constriction 9 extending around the mandrel tip in spaced relation thereto. The ring-shaped bead 9 forms an annular internal surface 9a of the die which is flared to define an enlargement of the die opening in the direction of extrusion through the die. Opposed to this flared surface 9a is an annular flared external surface 8a formed by the bead or enlargement 8 on the mandrel tip, the mandrel surface 8a being spaced from the die surface 9a in the direction of extrusion through the die opening. Thus, the flared surfaces 8a and 9a define an annular extrusion passage through the die.

With this construction, application of the extrusion pressure to the material in chamber 2 will cause at least one of the mandrel and die members 3—5 to be displaced away from the other and thereby constrict the annular extrusion passage between the surfaces 8a and 9a, and the material will be extruded through this constricted passage in the usual manner. Interruption of the extrusion pressure will cause relative movement of the mandrel and die members 3—5 toward each other, due to the tendency of each displaced member to spring back to its initial position upon release of the extrusion pressure. As a result, the annular extrusion passage between the surfaces 8a and 9a will be enlarged. Accordingly, interruption of the pressing action will not lead to formation of a "bamboo ring," as in conventional presses of this type, but will result in a more or less negligible reenforcement of the extruded tubing at the region thereof which happens to lie between the surfaces 8a and 9a when the interruption occurs. By proper designing of the tools 3 and 5, and particularly the parts 8 and 9, the extent of this reenforcement may be controlled. Also, since the extruded tubing is drawn over the external bead-like enlargement 8 of the mandrel tip, the tube is calibrated so as to enable perfect production of round pipes, cable-sheathing, and the like.

While it might be expected that a higher extrusion pressure would be required because of the protruding parts 8 and 9 on the mandrel and die, I have found, on the contrary, that the required extruding pressure is less than that which is customary in conventional extrusion presses of this type for a given diameter and thickness of the tubing.

It will be understood that either the mandrel 3 or the die 5, or both, may be mounted for slight movements back and forth in response to application and interruption of the extrusion pressure. Such movements can be readily accommodated by securing the mandrel holder 4 or the die holder 6, or both, to the head 1 (through bolts or the like, not shown) so as to provide for slight displacements relative to the head upon variations in the pressure in chamber 2. Accordingly, the mandrel holder 4 or the die holder 6 may be considered as a means mounting one of the mandrel and die members 3—5 for movements in opposite directions in response to the application and interruption, respectively, of the extruding pressure. Obviously, the extent of these relative movements between the mandrel and die members 3—5 should be limited to prevent the annular extrusion passage between the surfaces 8a and 9a from becoming too constricted upon application of the extrusion pressure and unduly enlarged upon interruption of the extrusion pressure. In cases where the mandrel 3 is to provide the relative movement between the parts 3—5, the die 5 is clamped to the head 1 in any suitable manner so that it cannot be displaced appreciably by pressure changes in chamber 2, and vice versa.

It will be apparent from the foregoing that in the illustrated embodiment of the invention I have provided means including the outwardly tapering external surface of mandrel 3 subjected to the extrusion pressure in chamber 2 and operable by this pressure to displace the mandrel away from the die member 5, that is, in the direction to reduce the width of the constricted passage portion between the projections 8 and 9, whereby the width of this last portion is increased by return movement of the mandrel 3 upon release of the extrusion pressure.

I claim:

In a press for applying sheathing to a core member, the combination of a head having a pressing chamber adapted to be charged with a material to be extruded under pressure, a die member forming an opening from said chamber, a hollow mandrel member extending through the pressing chamber into said opening and defining with the die member a generally annular passage through which said material is adapted to be extruded under pressure from the chamber surrounding the mandrel member to deposit a sheath upon said core member which latter moves through said hollow mandrel, the die member having an annular internal projection surrounding and partly defining said passage and projecting toward the mandrel member in said opening, the mandrel member having an annular external projection disposed in said opening and located downstream from said die projection, reckoned in the flow direction of the material extruded from the chamber, the projections individually aforesaid having adjacent opposed side surfaces defining an annular constricted portion of said passage, the width of said constricted portion determining the wall thickness of the extruded sheath, the mandrel and die members being secured against displacement relative to each other except for displacements incident to starting and stopping the extruding operation, and means including a movable surface subjected to the extrusion pressure in said chamber and operable by said pressure to displace the mandrel member in the direction to reduce the width of said constricted passage portion, whereby the width of the last portion is increased by return movement of the mandrel member in the opposite direction upon release of the extrusion pressure in the chamber and contraction rings in the sheath due to interruptions of the extruding pressure for work material charging are thus avoided.

References Cited in the file of this patent

UNITED STATES PATENTS

| | | |
|---|---|---|
| 1,854,411 | Leighton | Apr. 19, 1932 |
| 1,972,709 | Jacobson | Sept. 4, 1934 |
| 2,741,363 | Billen et al. | Apr. 10, 1956 |
| 2,819,794 | Krause | Jan. 14, 1958 |
| 2,924,332 | Lawton | Feb. 9, 1960 |

FOREIGN PATENTS

| | | |
|---|---|---|
| 330,049 | Great Britain | June 5, 1930 |
| 467,168 | Canada | Aug. 8, 1950 |
| 745,731 | Great Britain | Feb. 29, 1956 |